March 29, 1966 R. K. BOCK 3,243,201
TRAILER SIDE RAILS WITH INTEGRALLY FORMED AIR LINES
Filed April 30, 1964
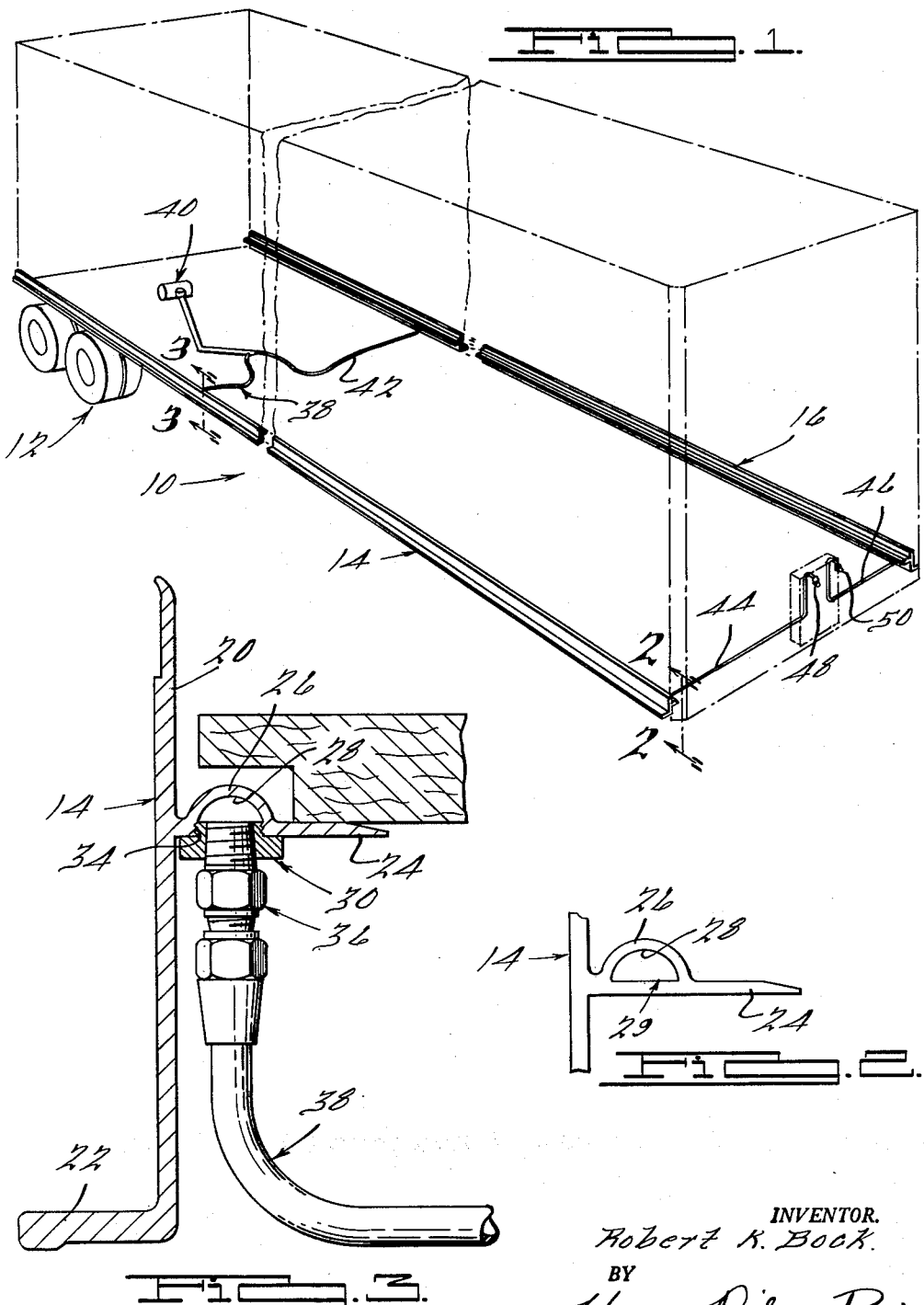
INVENTOR.
Robert K. Bock.
BY
Harness, Dickey & Pierce
ATTORNEYS.

United States Patent Office 3,243,201
Patented Mar. 29, 1966

3,243,201
TRAILER SIDE RAILS WITH INTEGRALLY FORMED AIR LINES
Robert K. Bock, Arcadia, Calif., assignor to Fruehauf Corporation, Detroit, Mich., a corporation of Michigan
Filed Apr. 30, 1964, Ser. No. 363,922
1 Claim. (Cl. 280—421)

This invention relates generally to truck and trailer constructions and more particularly to an improved lower side rail for a truck or trailer having an integral air line.

Heavy duty over-the-road trucks and trailers ordinarily are provided with air brakes on the rear wheel suspensions thereof. It has heretofore been the practice to run separate air lines longitudinally of the truck or trailer between the cab of the vehicle and the air cylinders on the rear wheel suspension. Such air lines not only are relatively expensive but are exposed to the environment, for example, flying debris, oil, grease and salt.

In accordance with the instant invention, the heretofore known and used air lines between the power unit of a truck or trailer and the air brakes on the rear wheel suspension thereof are replaced by an air line formed integrally with the lower side rails of the vehicle.

Accordingly, one object of the instant invention is an improved truck or trailer construction.

Another object is an improved integral air line for trucks, trailers, and the like.

Other objects and advantages of the instant invention will be apparent in the following specification, claim and drawings, wherein:

FIGURE 1 is a perspective view, partially in phantom, of a heavy duty over-the-road semi-trailer, showing the orientation of the integral air lines of the instant invention;

FIG. 2 is a view taken substantially along the line 2—2 of FIGURE 1, and

FIG. 3 is a cross sectional view taken substantially along the line 3—3 of FIGURE 1.

As seen in FIGURE 1 of the drawings, a heavy duty over-the-road semi-trailer 10 is provided with a rear wheel suspension 12 and a pair of lower side rails 14 and 16. The trailer 10 is of conventional construction except for the configuration of the lower side rails 14 and 16.

As best seen in FIGURE 2 of the drawings, the lower side rail 14, which is similar to the rail 16 in transverse cross section, has a vertically extending flange 20, a horizontal lower flange 22 and an intermediate flange 24. The intermediate flange 24 is provided with a raised arcuate section 26 which, in conjunction with the flat portion of the flange 24, defines a longitudinally extending passage 28. When the rail 14 is installed on the trailer 10, the passage 28 functions as an integral air line. The end of the passage 28 is closed by a plug 29.

As best seen in FIGURE 3 of the drawings, a fitting 30 is threaded into a complementary aperture 34 in the flange 24 of the side rail 40 for the acceptance of a conventional hose nipple 36. A conventional air line 38 is secured to the nipple 36 for connection to an air reservoir 40 thence to the brakes of the rear wheel suspension 12. Similarly a flexible air line 42 is connected to the lower side rail 16 and to the reservoir 40.

At the front end of the trailer 10 suitable connector lines 44 and 46 having conventional gladhands 48 and 50 thereon, are connected to the side rails 14 and 16 respectively to facilitate connection of the reservoir 14 to a source of air pressure on a tractor (not shown).

From the foregoing description it should be apparent that, in accordance with the instant invention, the lower side rails of the trailer not only function as structural components thereof but also as a means for conducting air from a source on a tractor to the brakes of a rear wheel suspension.

It is to be understood that the specific construction of the improved trailer construction herein disclosed and described is presented for the purpose of explanation and illustration and is not intended to indicate limits of the invention the scope of which is defined by the following claim.

What is claimed is:
In a heavy duty over-the-road vehicle having a rear wheel suspension with air operated brakes thereon,
the improvement comprising a load carrying longitudinally extending extruded lower side rail, said rail having a relatively wide vertically extending flange and an intermediate horizontally inwardly extending flange, said inwardly extending flange having a hollow arcuate portion extending vertically therefrom so as to define an integral longitudinally extending passage therein for the conduction of air from one end of said vehicle to the other,
means at the one end of the vehicle inboard of the vertical flange on said rail and protected thereby for connecting the passage in said rail to a source of compressed air,
and means at the other end of said vehicle inboard of the vertical flange on said rail and protected thereby for connecting the passage in said rail to the brakes of the vehicle.

References Cited by the Examiner

UNITED STATES PATENTS

| | | | |
|---|---|---|---|
| 2,150,701 | 3/1939 | Reid | 280—421 |
| 2,228,411 | 1/1941 | Sheridan | 180—66 |
| 2,480,413 | 8/1949 | Kirksey | 280—421 |
| 2,591,848 | 4/1952 | McLean. | |
| 2,797,829 | 7/1957 | Hart | 188—3 X |
| 3,096,996 | 7/1963 | Cole | 280—106 |

FOREIGN PATENTS 495,146   8/1953   Canada.

LEO FRIAGLIA, *Primary Examiner.*